J. K. GUMPPER.
TRACTION WHEEL TRANSMISSION MECHANISM.
APPLICATION FILED MAY 4, 1918.

1,306,005.

Patented June 10, 1919.

WITNESS:
Leo J. Dumais.

INVENTOR.
John K. Gumpper
BY
Roth Kloss
ATTORNEY

UNITED STATES PATENT OFFICE.

JOHN K. GUMPPER, OF CHICAGO, ILLINOIS, ASSIGNOR OF ONE-HALF TO WILLIAM H. WOOLUMS, OF DECATUR, ILLINOIS.

TRACTION-WHEEL TRANSMISSION MECHANISM.

1,306,005. Specification of Letters Patent. Patented June 10, 1919.

Application filed May 4, 1918. Serial No. 232,504.

*To all whom it may concern:*

Be it known that I, JOHN K. GUMPPER, a citizen of the United States, residing at Chicago, in the county of Cook and State of Illinois, have invented certain new and useful Improvements in Traction-Wheel Transmission Mechanism, of which the following is a specification.

My invention relates to gearing and has for its primary object the provision of improved connections in a motor vehicle whereby a power shaft may be joined to a driving wheel to operate the latter at varying speeds.

A further object of the invention resides in the provision of an improved arrangement of parts whereby power for other than traction purposes may be developed in a motor vehicle from a power shaft axially alined with a driving shaft, whereby, during the development of said power for other than traction purposes, said driving shaft and all parts geared thereto may be idled with respect to the power shaft.

Other objects and advantages of my invention will appear from the following description taken in conjunction with the accompanying drawings which form a part of this specification, and illustrate the preferred embodiment of my invention.

In the drawings:

Fig. 4 is a view similar to Fig. 1 illustrating a modification.

Figure 1:
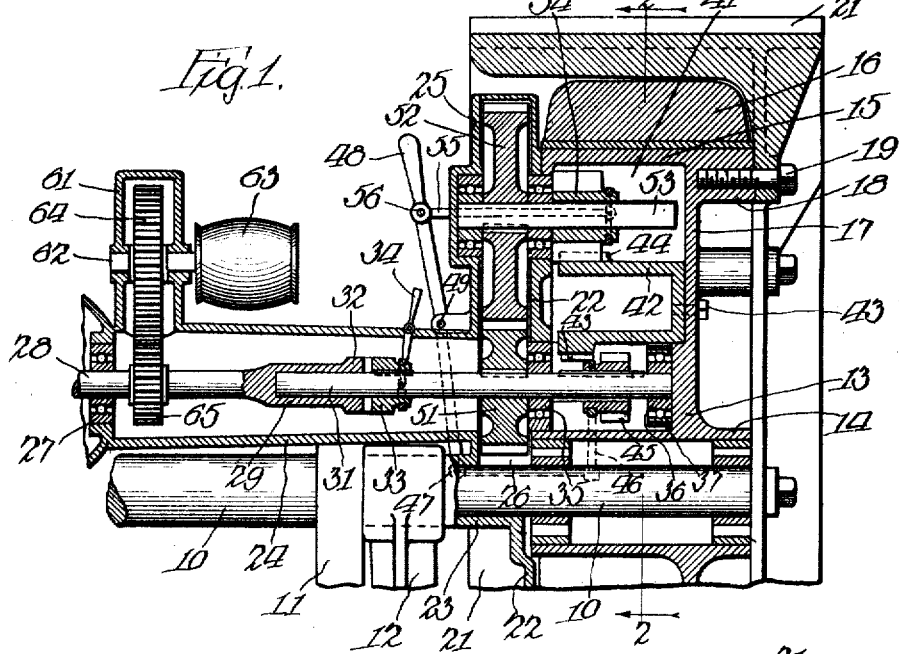
Figure 1 is a fragmentary horizontal section of the rear housing, driving wheel, and operating parts contained therein, of a motor vehicle showing in fragmentary plan view, the load-carrying axle upon which the driving wheel revolves, illustrating a tractor wheel fixed to the driving wheel, and means for developing power for other than tractor purposes.

A load-carrying axle 10, connected to motor vehicle frame 11 by means of a side rod 12, rotatably supports a driving wheel generally indicated by numeral 13. The driving wheel comprises a hub 14 a felly 15 carrying a solid rubber tire 16, and a metal web 17 connecting the hub and felly.

Preferably the felly of the driving wheel is formed with bosses 18 threaded to receive bolts 19 by means of which a tractor wheel 21 may be fixedly secured to the driving wheel. At a point contiguous to the driving wheel a heavy metal disk 22 is fixed upon the axle 10 by means of a tubular center boss 23, this disk substantially paralleling the driving wheel web 17 and being positioned near and fitting within the inner edge of the driving wheel felly. A rear housing 24, mounted in any suitable way (not shown) in the frame 11, is joined in any suitable manner (not shown) to a plate 25 which articulates with disk 22 to form a dust-proof chamber 26 for the reception of certain gears to be described.

Figure 2:
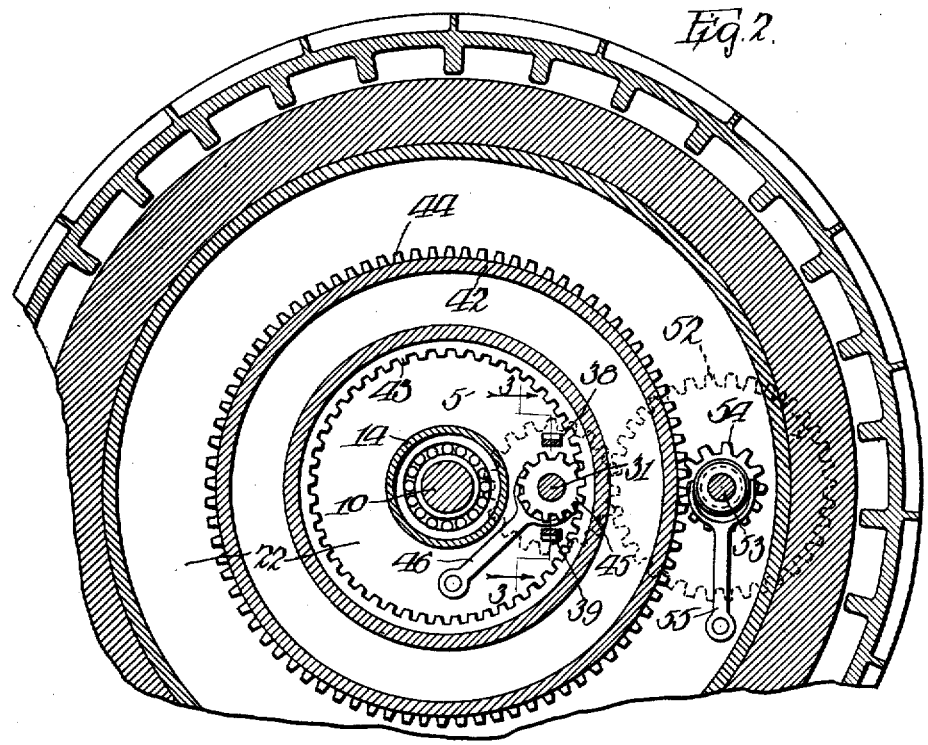
Fig. 2 is a fragmentary vertical section taken on line 2—2 of Fig. 1.
Figure 3:
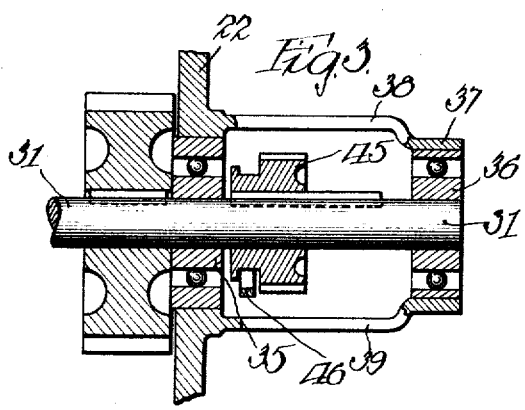
Fig. 3 is a fragmentary vertical section taken approximately on line 3—3 of Fig. 2.

In a bearing 27 supported in the housing 24 is journaled a power shaft 28 the outer end 29 of which is socketed to receive an inner driving shaft 31. Formed on the outer end of socket 29 is a fixed clutch member 32 and a companion clutch member 33 is splined upon inner driving shaft 31 and may be moved into and out of operative engagement with member 32 by means of a handled lever 34 which projects out of the housing 24. The inner driving shaft 31 is supported for rotation at three separate points. The first of these is the socketed end 29 of the power shaft; the second is a bearing 35 supported in and within the plane of disk 22; and (see Figs. 1, 2 and 3) the third is a bearing 36 supported adjacent the web 17 of the driving wheel in a bearing bracket 37 supported from disk 22 by diametrically opposite vertically alined arms 38 and 39. A dust-proof annular recess 41 is formed by web 17 of the driving wheel, disk 22, hub 14, and felly 15; it being understood that web 17 and disk 22 are spaced considerably from each other. Within the recess 41 is positioned an annular channel member 42 fixed by bolts 43 to the inner side of the driving wheel web 17 and of a diameter to stand about midway between hub 14 and felly 15. An inner annular driving rack 43 is formed interiorly on this channel member, and an outer driving rack 44 exteriorly thereon, see Figs. 1 and 2. Splined on inner driving shaft 31 between bearings 35 and 36 is an inner driving pinion 45 adapted to slide along the shaft into or out of mesh with the rack 43. This pinion is operated by a shifting arm 46 pivoted as at 47 to the lower end of a shift lever 48, the latter pivoted at 49 to the rear housing. In Fig. 1 the inner driving pinion 45 is shown in neutral position.

Within chamber 26 a power pinion 51 is keyed to the inner driving shaft 31 and meshes constantly with a power gear 52 keyed, within the chamber 26, to an outer driving shaft 53 which is journaled in suitable bearings mounted respectively in the plate 25 and disk 22. Shaft 53 extends into the recess 41 and carries splined upon itself an outer driving pinion 54 slidable into and out of mesh with the outer rack 44 and operated in this movement by a shift arm 55 pivoted as at 56 to shift lever 48. In Fig. 1 the outer driving pinion 54 is shown meshed with the outer rack 44 to turn the driving wheel and tractor wheel at low speed from power shaft 28. It will be noted that both racks 43 and 44 are at the extreme inner edges of the channel member 42 and that arm 46 is connected to lever 48 below pivot 49 while arm 55 is connected to that lever above pivot 49. By this arrangement the low speed pinion is thrown to neutral when the high speed pinion is meshed with the inner rack, and vice versa.

In Fig. 4 is shown a modification of the arrangement for the racks wherein the inner rack 57 is half way between the inner and outer edges of the channel member 42, and the outer rack 58 is nearer the web 17 of the driving wheel than the disk 22. Incident to this arrangement I provide a bearing 59 for the outer end of the driving shaft 53 supported in a bracket identical with that shown in Fig. 3, and I furnish the outer driving shaft 53 with three spaced supports as shown, leaving but two for the inner driving shaft 31. This arrangement of the racks results in the application of power to the low speed rack, for driving the vehicle as a tractor, to the driving wheel at a point near the strong metal web 17 and at substantially the vertical center of the tractor wheel. Thus strain on the parts incident to the great load on the tractor when plowing is maintained at the minimum.

At 61 is shown a pulley gear casing opening off of the rear housing 24 and mounting a pulley shaft 62 which carries a pulley 63 outside the casing for transmitting power for other than tractor purposes. Keyed on the shaft 62 within the casing is a pulley gear 64 constantly meshed with a pulley pinion 65 fixed on power shaft 28. When it is desired to keep the vehicle stationary and use its power for other than traction purposes the handled lever 34 is thrown to move splined clutch member 33 out of engagement with fixed clutch member 32 so as to disconnect the wheel driving mechanism.

In both of Figs. 1 and 4 the inner and outer driving pinions are shown in full lines to apply power at low speed to the driving wheel and tractor wheel, while Fig. 4 illustrates in dotted lines the high speed driving position of the parts.

While I have illustrated and described the preferred embodiment of the invention, it will be obvious that one skilled in the art may make modifications thereof without departing from the spirit of the invention. I wish, therefore, not to be restricted to the precise embodiment shown, except in so far as the same is limited in the appended claims.

I claim:

1. In a motor vehicle, the combination of a driving wheel, high and low speed concentric annular racks fixed to the inner side of the wheel near the plane of the inner edge thereof, a power shaft, high and low speed driving shafts connectible to the power shaft for actuation thereby, high and low speed driving pinions respectively splined on said driving shafts, and means for selectively meshing said pinions with their respective racks.

2. In a motor vehicle, the combination of a load carrying axle, a driving wheel mounted thereon, a rear housing, a disk carried on the axle near the inner edge of the driving wheel, a high speed annular rack fixed to the wheel, a high speed pinion in mesh with the rack, and a high speed driving shaft on which said pinion is splined, there being three spaced bearings for said driving shaft.

3. In a motor vehicle, the combination of a load carrying axle, a driving wheel mounted thereon, a rear housing, a power shaft supported therein, a disk carried on the axle near the inner edge of the driving wheel, a high speed annular rack fixed to the wheel, a high speed pinion in mesh with the rack, there being a bearing socket formed in the end of the power shaft, a bearing mounted in said disk, an alined bearing spaced from the disk and within the rim of said wheel, and a high speed driving shaft on which said pinion is splined, said driving shaft being journaled in the socketed end of the power shaft and in said bearings and releasable clutch means for connecting said power and driving shafts.

4. In a motor vehicle, the combination of a load carrying axle, a driving wheel mounted thereon, a rear housing, a power shaft supported therein, a disk carried on the axle near the inner edge of the driving wheel, a high speed annular rack fixed to the wheel, a high speed pinion in mesh with the rack, a bearing spaced from said disk and supported therefrom within the rim of said wheel, a bearing supported in and within the plane of the disk, and a high speed driving shaft on which said pinion is splined, said driving shaft being mounted in said bearings and having socketed engagement with the power shaft with which it is axially alined and releasable clutch means for connecting said power and driving shafts.

5. In a motor vehicle, the combination of a driving wheel, high and low speed driving racks fixed thereon, high and low speed driving shafts paralleling the axis of the wheel and passing through the planes of the respective racks, and high and low speed driving pinions mounted slidably and against rotation on the respective driving shafts and selectively movable into and out of mesh with the respective high and low speed racks.

6. In a motor vehicle, the combination with a driving wheel, of a power shaft paralleling the axis thereof, and mechanism for selectively driving said wheel from the power shaft at high or low speeds, said mechanism comprising high speed and low speed driving shafts being contained wholly within the cylindrical surface defined by the perimeter of the wheel.

7. In a motor vehicle, the combination with a rear axle, and a driving shaft parallel thereto, of a driving wheel mounted on the axle, mechanism contained within the perimeter of the wheel for driving the same from the driving shaft, a power shaft connectible to the driving shaft to turn the latter, a power delivering pulley geared to the power shaft, and clutching means for disconnecting the driving shaft from the power shaft and for connecting said power and driving shafts together at will.

In testimony whereof I affix my signature.

JOHN K. GUMPPER.

Copies of this patent may be obtained for five cents each, by addressing the "Commissioner of Patents, Washington, D. C."